S. GORR.
Wagon-Brake.
No. 200,051. Patented Feb. 5, 1878.
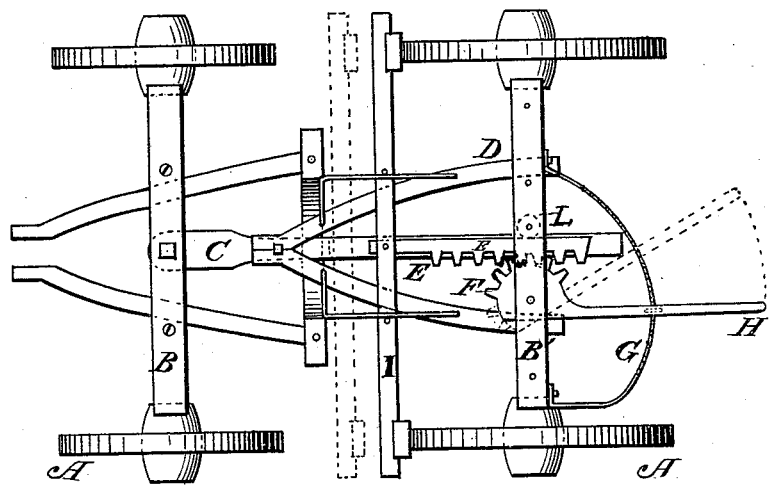
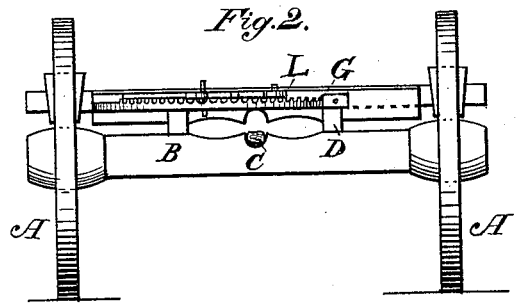
Attest:
F. H. Schott
A. Watson
Inventor:
Solomon Gorr
By Daniel Breed
Atty

UNITED STATES PATENT OFFICE.

SOLOMON GORR, OF ALLENTOWN, PENNSYLVANIA.

IMPROVEMENT IN WAGON-BRAKES.

Specification forming part of Letters Patent No. 200,051, dated February 5, 1878; application filed July 13, 1877.

*To all whom it may concern:*

Be it known that I, SOLOMON GORR, of Allentown, in the county of Lehigh and State of Pennsylvania, have invented certain new and useful Improvements in Wagon-Brakes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention consists in a novel construction and arrangement of devices forming a wagon-brake, which will be fully understood by the following description.

In the accompanying drawings, Figure 1 is a top view of my improved brake applied to a wagon. Fig. 2 is a rear view of the same.

The construction of my wagon-brake is designed especially for heavy wagons, and the brake-lever is placed behind the rear axle, so as to be operated while the driver stands upon the ground. This arrangement of the brake-lever is almost necessary in hay-wagons.

The brake-bar I is arranged to ride on the hounds D, and is provided with shoes in the usual manner. A toothed bar, E, has its forward end pivoted to the center of the brake-bar I by a strong bolt, and the rear end of this toothed bar extends backward beyond the hind axle B.

The brake-lever H has a segment-gear, which is pivoted to the rear bolster or axle, while the teeth F of the segment engage with the toothed bar E, thus giving great power to the lever H upon the brake-bar.

In order to prevent friction, and also to hold the bar E to proper line of action when the lever H is under heavy strain, an anti-friction roller, L, is placed so as to support the bar E, and thus oppose the lateral pressure of the bevel-gear upon this bar.

On the rear of the axle B, or of the bolster B', is a strong ratchet-bar, G, for catching and holding the lever H as the brake is applied.

By the above construction we have a very simple and powerful wagon-brake. The lever H is very long, while the segment cog-gear F gives a very short arm, thus enabling the operator to exert great force by moderate power applied to lever H, which is capable of traveling a long distance upon the rack G if necessary.

The advantages of my brake are, first, the great power thereof; and, second, the lock or shoes may be thrown a great distance away from the wheel, thus preventing any difficulty from mud or other substance caught on the wheels. The cog-bar E takes hold of the middle of the brake-bar I, and thus acts equally on both wheels.

I do not claim the cog-bar or other devices, but believe that my new arrangement and combination of devices form a new construction of wagon-brake.

Having thus described my invention, I claim—

The combination of the segment-lever H, the toothed bar E, and the roller L, arranged upon the rear axle or bolster, provided with the ratchet-bar G, substantially as set forth.

In testimony that I claim the foregoing as my own I affix my signature in presence of two witnesses.

SOLOMON GORR.

Witnesses:
  TILGHMAN GOOD,
  WM. WETTMAN.